April 15, 1958    R. J. BLOCK ET AL    2,830,905
DEMINERALIZATION OF SOLUTIONS
Filed Nov. 22, 1954    3 Sheets-Sheet 2
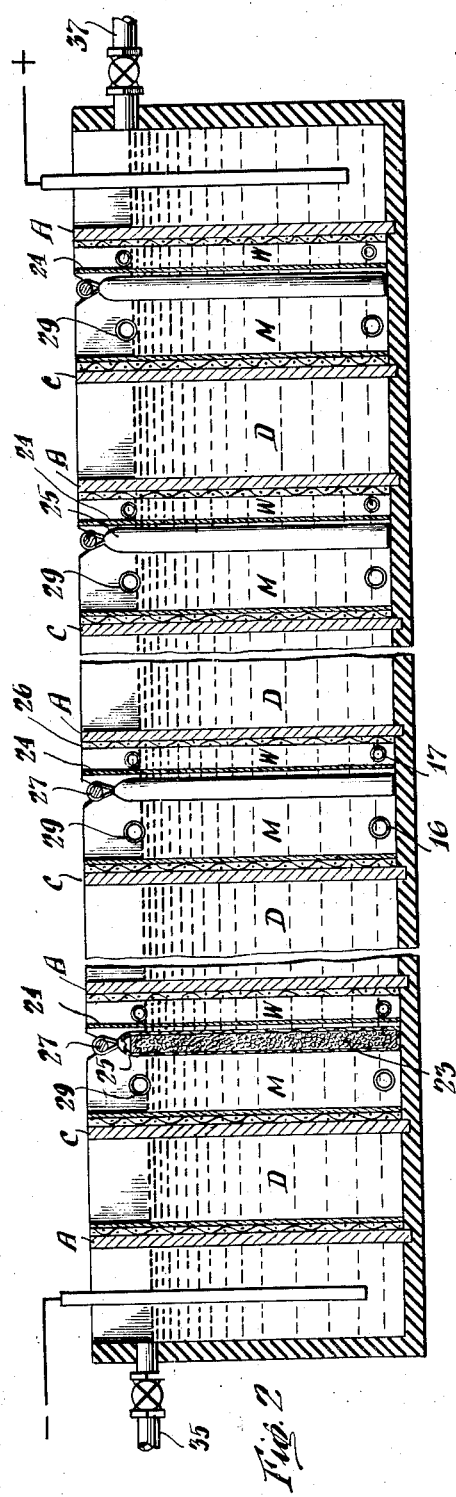
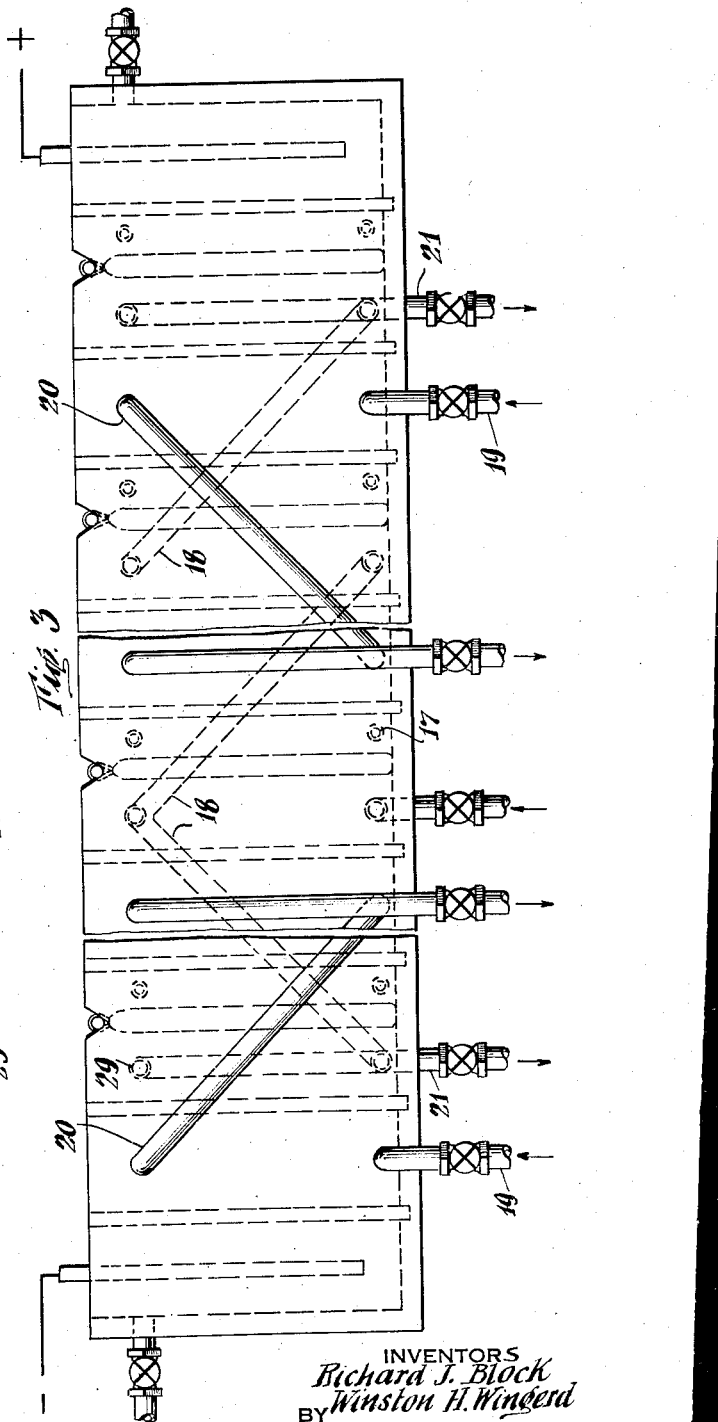
INVENTORS
*Richard J. Block*
BY *Winston H. Wingerd*
*Robert Culvert*
ATTORNEY

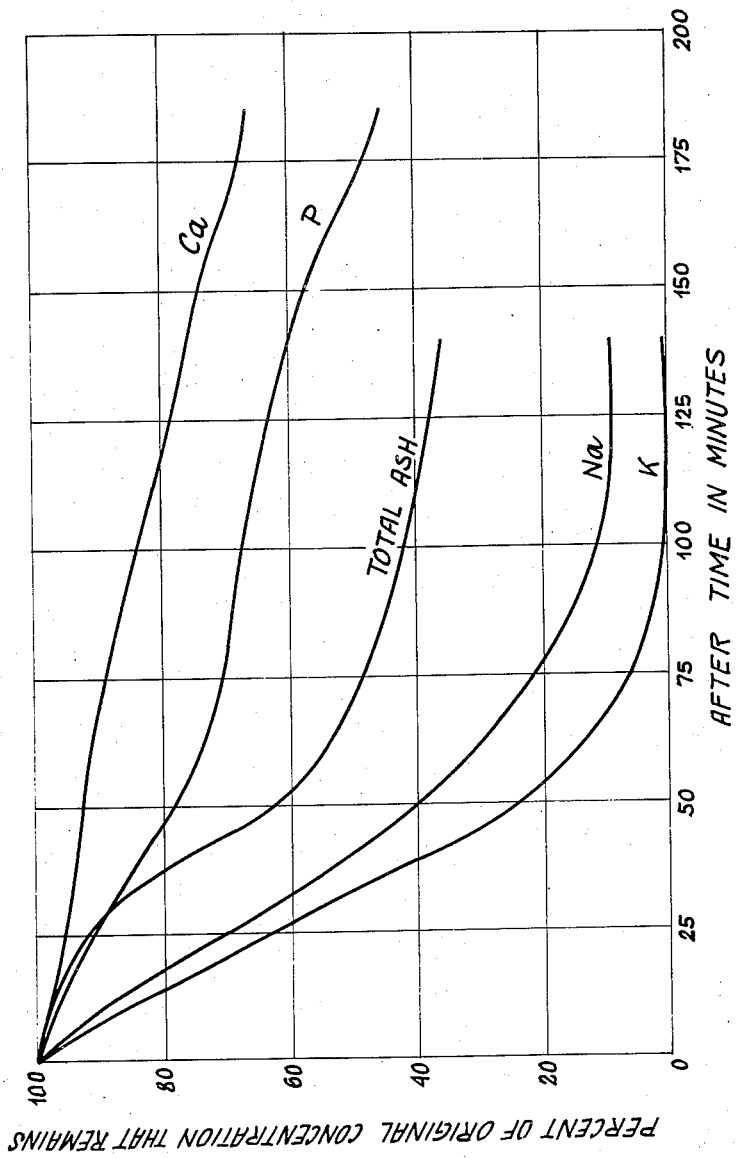

United States Patent Office 2,830,905
Patented Apr. 15, 1958

2,830,905

DEMINERALIZATION OF SOLUTIONS

Richard J. Block, Scarsdale, and Winston H. Wingerd, Yonkers, N. Y., assignors to The Borden Company, a corporation of New Jersey Application November 22, 1954, Serial No. 470,340

6 Claims. (Cl. 99—54)

This invention relates to the demineralization of acid precipitable, colloidal solutions.

It is particularly useful in connection with the removal of sodium from milk while preserving therein a large proportion of the original calcium content. For that reason, the invention will be first illustrated by description in connection with such use.

The importance of milk of low sodium content, for human consumption under certain pathological conditions, has been recognized for some time and various procedures have been proposed for removing sodium from milk. One procedure involves demineralization by passage of the milk over selected ion exchange resins. This process is not only expensive but also unsatisfactory. It gives a milk that is unstable to heat and that, after spray drying, does not lend itself satisfactorily to reconstitution with water. Furthermore, the ion exchanger removes desirable calcium as well as the undesirable sodium. Another process is electrodialysis, which, when applied to milk in usual manner, causes precipitation of casein as the electrodialysis proceeds.

We have now discovered a process which avoids these difficulties. Our process gives a milk that is stable and very low in content of the alkali metals but that retains most of the original calcium associated with the milk protein substantially as in the original milk.

The present application is a continuation in part of our copending application Serial No. 463,014, filed on October 18, 1954, and entitled Fractionation of Amino Acids, the present invention involving use of the apparatus of the copending application modified as described herein.

Briefly stated, our invention comprises the electrodialysis of milk with ion selective permeable membranes and an acid absorbing ion exchanger in contact with the milk being electrodialyzed.

By this process, we remove up to 99% of the potassium and 95% of the sodium content of the milk, in a representative run, while retaining in solution considerably over half of the original calcium and in fact up to two-thirds of it in a representative run. Also we decrease the ratio of phosphorus from about 26.5 parts as $P_2O_5$ to 23.3 parts of calcium as CaO in cows' milk to nearer the ratio for human milk. This ratio for human milk is stated in the literature as 16.6 $P_2O_5$ to 23.3 CaO.

The ion exchanger used may be illustrated by an amine $RNH_2$ in which R is an organic group of such nature as to make the whole insoluble in water. Such compound reacts with an acid (HA) thus:

$$RNH_2 + HA \rightleftharpoons RNH_3A$$

The ion exchanger and retained acid are subjected to electrolytic decomposition in our process, by the electrical potential, so that acid is electrolyzed from the ion exchanger, the anion of the acid leaving the exchanger and moving in the direction of the anode. This electrolysis of the acid restores the ion exchanger in part at least to condition for reuse, that is, to receive additional acid. As a result, the exchanger may be reused, for example 3 or 4 times. Then it is revived additionally by washing with ammonia or the like, to restore it substantially completely to the basic cycle in which it is absorptive of acid or to remove material lodged mechanically in the exchanger.

Regardless of the exact mechanism of the reaction, the resin absorbs acid and retains it until such time as the acid is electrolyzed and thus prevents the pH of the milk from falling to a level which causes precipitation of casein.

Finally, the calcium of the milk is considered to be present in the form of an organic milk protein structure which retards migration of the calcium ion or in fact its initial formation, so that the calcium remains largely in the milk after the electrodialysis is completed and in the assimilable structure of the original milk.

As a result, we make continuously a heat stable milk product that, at a pH of 6.4 or higher, is adapted to spray drying or to dewatering by lyophilization to a powder. The powder so made reconstitutes readily with water. The casein in our electrodialyzed milk, furthermore, is stable without precipitation at temperatures up to 80° C. and a pH as low as 6.4.

In the electrodialysis as described, there is no substantial deposition of casein on the membranes used in the dialysis.

The invention will be further illustrated by description in connection with the attached drawings.

Fig. 1 is a graph showing the percentages of the original proportions of sodium, potassium, calcium, phosphorus and total ash that remain in the milk after electrodialysis for varying periods of time.

Fig. 2 shows a vertical sectional side view of apparatus for carrying out the process of the invention.

Fig. 3 is a side view of the same apparatus.

Figure 4:
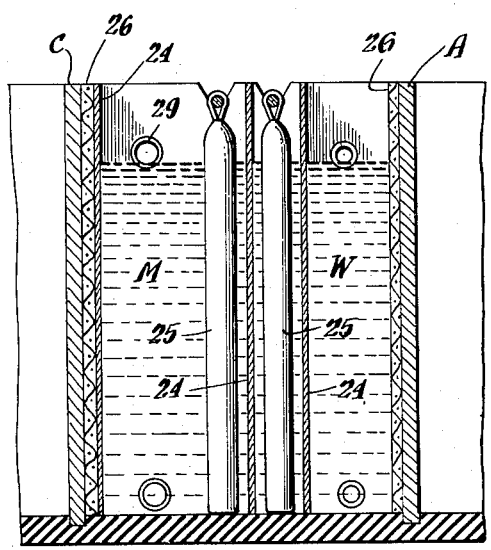
Figs. 4 and 5 are side sectional views of modified arrangements with the milk cells (M) and water compartments (W) that may be substituted for the M and W units of Figs. 2 and 3.

The figures are in part diagrammatic.

In the electrodialysis apparatus, the cells for holding the milk are indicated by M, those containing originally a weak electrolyte solution and eventually the electrodialyzed sodium and potassium salts by D, and compartments for water at W. The water compartment and water circulation may be omitted when their effect is not desired. When water is circulated through the compartments W, however, we effect simultaneous dialysis and electrodialysis. This combination speeds up the demineralization and also removes lactose, to give a high protein product.

The ion selective permeable membranes A are permeable to anions and the corresponding membranes C are cation permeable. The membranes A are on the sides of the milk cells towards the anode and the membrane C on the cathode side. Disposed between the said membranes and the milk and serving to decrease fouling of the membranes are semi-permeable diaphragms in the form of films or sheets 24 and spacing elements such as plastic mesh 26 between the semi-permeable and the ion selective members, that is, between 24 and C. The diaphragms 24 are permeable to both anions and cations and are substantially ion-non-selective, even though some of the satisfactory diaphragm materials have some appreciable retentive power for anions or cations. These diaphragms separate the units into cells M for the milk itself and compartment W for water, for washing away acid separated electrolytically from the exchanger in container 25 in the embodiment in which water is used.

The milk cells or water compartments or both contain ion exchanger 23 in holders 25, with permeable face and back, supported by any suitable means as at 27.

In general, the exchanger forms a layer between the milk and the anode and also between the milk and the anion passing membrane.

The membranes 24 may be on either side of the ion exchanger layer 23, so as to place that layer in either the milk cell or the water compartment. Also the exchanger 23 may be disposed on both sides of the membrane, so that both the milk cells and water compartments contain ion exchanger.

The liquids are admitted through pipes such as 16 for the milk cells, 17 for water, and 19 for the dialysate compartments. The milk overflows from draw-off positions near the tops of the cells to the bottoms of the next milk cells through pipes 18 and finally passes through outlet to receiver (not shown) for the demineralized milk.

The dialysate or salt solution progresses, in direction generally counter-current to the milk, through pipes 20. The water in compartment W may remain throughout the run or it may be continuously replaced with fresh water, the acid portion going to waste through outlets shown at the upper surface of the liquid in the "W" cells.

The cathode compartment is provided with outlet 35 and the anode compartment with outlet 37.

The various outlets are located at about the same level, so as to avoid gravity movement of the liquid through the membranes A and C.

The several liquids moving through the system are caused to circulate in a relatively long course between the positions of inlet and outlet from a given compartment. This is effected to advantage by a series of baffles of conventional type (not shown) appropriately disposed between the inlets and outlets.

As to materials, we use whole or skimmed milk as the material to be electrodialyzed. In place of the milk we may use, however, other colloidal solutions that contain electrolytes to be removed from solutions and that are sensitive to acid, that is, undergo coagulation or precipitation when the pH falls below a minimum level. Thus, we may demineralize aqueous solutions of blood serum proteins, soluble soy protein, gold sols, and colloidal solutions of vegetable gums or dyestuffs.

The cation passing membranes C and the anion passing membranes A may be any one of those commercial ion selective membranes for such purpose as, for example, any one of those described in our said copending application such as those known commercially as Amberplex membranes. Other examples are the phenol sulfonic acid and formaldehyde polymer and the Amberlite IRC-50 and polystyrene resin, of U. S. Patent 2,636,851 to Juda and McRae.

The ion exchanger such as an exchange resin is one that, when adjusted to the basic cycle, is absorptive of organic acids. In order that the exchanger may be susceptible to electrodialysis of acid therefrom, as described, the resin should be only weakly basic. Such weakly basic resin will give, to milk or like aqueous colloidal solution with which the resin is in contact, a pH of 6.5–7.5. A resin giving pH below 6.5 is not sufficiently absorptive of acid. A pH substantially above 7.5 would cause casein to migrate towards the anode. Examples of such ion exchangers that are mildly basic and that are used to advantage by us are those containing primary, secondary, or tertiary amine groups. Specific examples are Amberlite IR-45, cross linked polystyrene with dipropyl amine; Amberlite IR-4B, phenol and formaldehyde polyamine condensate; and the quaternary ammonium hydroxide type products and melamine-guanidine formaldehyde products described in said Patent 2,636,851 and also in Patent 2,636,852 to Juda and McRae.

The materials of construction of the several parts of the equipment are those that are conventional for corresponding parts of like apparatus. The semipermeable film or sheet 24 may be a film of cellophane, parchment, or parchmentized paper.

The spacing member 26 may be a mesh of plastic such as woven cellophane strips, nylon, rubber, polyethylene or other non-conducting material.

Containers 25 are suitably flat bag-shaped members or actual bags of fabric or of the same materials as spacers 26. Suitably the bags are so shaped and mounted as to hold the ion exchanger in a layer extending generally parallel to an anion passing membrane A and adjacent thereto. The meshes or other openings in 25 must be sufficiently small to retain the particles of ion exchanger. The shape of the containers may be established by a U-shaped frame (not shown) with base down, of hard rubber, urea-formaldehyde resin, polystyrene or the like with the bag material drawn over the frame or secured over the face and back thereof.

As to conditions of operation, room temperature is satisfactory although a temperature raised somewhat by the heating effect of the electric current is satisfactory.

The voltage is that which gives a maximum permissible current density without introducing undesirable side reactions or other complications. Ordinarily we use a voltage of 110 D. C. The number of cells may be large as, for instance, 50–100, partly in series and partly in parallel. If the number of cells in series is insufficient to reduce the current to a reasonable level, we introduce into the series a resistance, as for instance, to make the total resistance about 40–100 ohms. The potential difference is sufficient to cause discharge of sodium and chloride ions at the two electrodes, although only small amounts are actually liberated.

The electrodialysis is continued until at least 90% of the total combined weight of sodium and potassium has been removed from the milk.

This operation is continued, with the continuous introduction of fresh milk and fresh water, until the ion exchanger becomes spent to the extent that the pH in the milk cells or any one thereof falls to a level below 6.5. When that condition arises, the exchanger is then removed, as in its container bag, and is revivified by washing with ammonium hydroxide solution and then with water to remove the excess of free ammonia. The bag of thus revivified and washed exchanger is restored to its position in the M or the W cell. In an alternative procedure, the ion exchanger is revivified in situ; the liquid is drained from the cell and the exchanger is treated with the ammonia and then with water.

The invention will be further illustrated by detailed description in connection with the following specific examples of the practice of it.

*Example 1*

Figure 5:
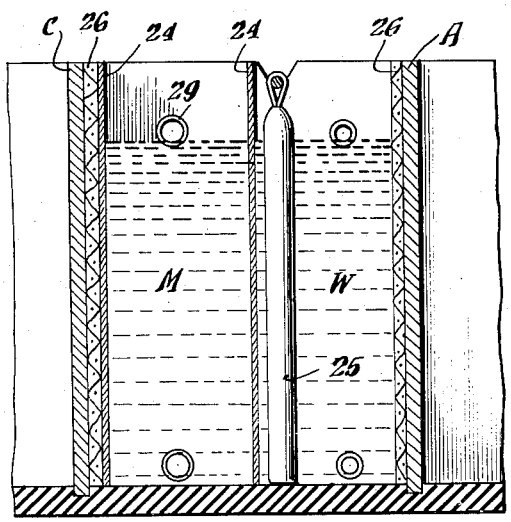

Fifty grams of dry skim milk ("Starlac") were dissolved in 500 ml. of distilled water and recirculated through electrodialysis equipment assembled as in Fig. 2 with two milk cells M and thin cellophane sheeting to the left of the ion exchanger layer, as in Fig. 5. This sheeting separates each milk cell from the adjacent water compartment. The exchanger layer 23 in the water compartment contained 6 g. of Amberlite IR-45.

The initial amperage and voltage were 245 milliamps and 110 volts, respectively. The initial pH of the milk was 6.6 and the initial conductivity was 3,200 micromhos.

Two hundred and ten minutes were required to reduce the conductivity of the milk to 510 micromhos which is a conductivity equivalent to 300 ppm. of NaCl. The decrease in sodium, potassium, calcium, phosphorus and total ash with time is shown in Fig. 1. The final amperage and voltage were 70 milliamps and 110 volts, respectively. The final pH of the milk was 7.3.

*Example 2*

Three pounds of dry skim milk ("Starlac") were dissolved in 10 liters of distilled water and recirculated through a larger dialysis cell of kind shown in Fig. 2 and of size to hold about 5 liters of milk. The cell contained six milk compartments which were separated from each of the adjacent water compartments by cellophane. Each milk compartment contained 135 grams of Amberlite IR-45 in the layer 23 which gave a total of 810 grams of resin in the cell.

The initial amperage and voltage were 2.86 amps and 120 volts, respectively. The initial pH of the milk was 6.6; due to some free acid in the membranes at the start of the experiment, however, the pH of the milk had fallen to 6.1 at the end of 90 minutes. Consequently, it was necessary to add ammonia to restore the pH to approximately 7 and avoid precipitation of protein. Thus we added 10 ml. of concentrated ammonium hydroxide to the milk reservoir, in order to bring the pH of the milk to 7.2. At the end of 270 minutes the pH of the milk had again fallen to 6.5 and an additional 4 ml. of concentrated ammonium hydroxide were added to bring the pH back to 7.3.

The experiment was completed at the end of 390 minutes when the pH of the milk was 6.7 and the specific conductivity was 800 micromhos. The final amperage and voltage were 580 milliamps and 120 volts, respectively.

*Example 3*

The procedure of Example 1 was followed except that 100 g. of "Starlac" were used in 500 ml. of tap water and granular exchanger 23 was placed in both the milk cells and in the water compartments.

*Example 4*

In place of the granular anion exchange resin, the milk was kept continuously neutralized to pH about 7.0–7.3 by the addition of ammonia.

In place of the ammonia, we may use other alkaline materials such as volatile amines including mono-, di-, or tri-, methyl or ethyl amine or hydroxylamine.

These neutralizing agents are effective but involve the disadvantage that they too pass through the ion exchange membranes and consequently increase the power consumption needed to demineralize the milk.

It will be understood that it is intended to cover all changes and modifications of the examples of the invention herein chosen for the purpose of illustration which do not constitute departures from the spirit and scope of the invention.

What we claim is:

1. In removing alkali metals from an aqueous dispersion of milk solids by electrodialysis while leaving a large proportion of the original calcium content therein, the process which comprises maintaining the said dispersion during the electrodialysis in contact with a water insoluble ion exchanger adjusted to the basic cycle, so as to be absorptive of acid, the exchanger being one that, in contact with the dispersion, raises the pH to a level as high as 6.5 but not above 7.5.

2. The process of claim 1 in which the electrodialysis is effected with an ion selective anion passing membrane disposed in the system between the said dispersion and the anode and between the said exchanger and the anode and an ion selective cation passing membrane between the dispersion and the cathode, and the electrodialysis is continued until at least 90% of the total alkali content is removed from the dispersion, the exchanger absorbing acid and the electrical potential causing the acid to migrate from the exchanger.

3. The process of claim 2 in which the ion exchanger is in the form of a layer generally parallel to the anion passing membrane and water is circulated between the said layer and the anion passing membrane.

4. In removing acid from an aqueous dispersion of milk solids by electrodialysis, the improvement comprising subjecting the dispersion to contact with an acid absorbing ion exchanger resin disposed in the said dispersion, the electrolysis that occurs causing the anions of the acid to migrate toward the anode, to a position beyond the resin, thus partly restoring the exchanger to condition to absorb additional anions, and circulating wash water through the space between the resin and the anode, the wash water removing from the said space ions that pass through the resin in its restoration and thus preventing continued migration of the anions towards the anode.

5. In removing alkali metals from an aqueous dispersion of milk solids by electrodialysis while leaving a large proportion of the original calcium content therein, the process which comprises subjecting the said dispersion to electrodialysis and maintaining the dispersion at all times during the electrodialysis at a pH of approximately 7 so as to avoid precipitation of protein from the dispersion.

6. Partially demineralized milk solids comprising less than 10 percent of the original content of sodium and potassium combined and more than half of the original calcium content, the calcium being associated with the protein of the milk solids substantially as in the original milk solids.

References Cited in the file of this patent

UNITED STATES PATENTS

| | | |
|---|---|---|
| 2,636,851 | Juda et al. | Apr. 28, 1953 |
| 2,636,852 | Juda et al. | Apr. 28, 1953 |

FOREIGN PATENTS

| | | |
|---|---|---|
| 406,407 | Great Britain | Mar. 1, 1934 |
| 1,066,583 | France | Jan. 20, 1954 |

OTHER REFERENCES

Bartow et al.: Industrial and Eng. Chem., vol. 25, No. 3, March 1933, pages 336 to 338.